United States Patent
Rogers

(10) Patent No.: US 8,373,522 B2
(45) Date of Patent: Feb. 12, 2013

(54) HIGH ACCURACY MEMS-BASED VARACTORS

(75) Inventor: John E. Rogers, Vero Beach, FL (US)

(73) Assignee: Harris Corporation, Melbourne, FL (US)

( * ) Notice: Subject to any disclaimer, the term of this patent is extended or adjusted under 35 U.S.C. 154(b) by 451 days.

(21) Appl. No.: 12/699,118

(22) Filed: Feb. 3, 2010

(65) Prior Publication Data
US 2011/0188168 A1 Aug. 4, 2011

(51) Int. Cl.
*H01G 5/18* (2006.01)
*H01G 7/06* (2006.01)
(52) U.S. Cl. .......................... 333/197; 361/281; 361/290
(58) Field of Classification Search .................. 333/197; 361/281, 290; *H01G 5/18, 7/06*
See application file for complete search history.

(56) References Cited

U.S. PATENT DOCUMENTS

| | | | |
|---|---|---|---|
| 5,025,346 A | 6/1991 | Tang et al. | |
| 5,959,516 A | 9/1999 | Chang et al. | |
| 6,133,670 A | 10/2000 | Rodgers et al. | |
| 6,360,033 B1 | 3/2002 | Lee et al. | |
| 6,404,304 B1 | 6/2002 | Kwon et al. | |
| 6,497,141 B1 | 12/2002 | Turner et al. | |
| 6,621,390 B2 | 9/2003 | Song et al. | |
| 6,661,069 B1 | 12/2003 | Chinthakindi et al. | |
| 6,784,766 B2 | 8/2004 | Allison et al. | |
| 6,798,315 B2 | 9/2004 | Schaefer | |
| 6,853,534 B2 | 2/2005 | Williams | |
| 6,975,193 B2 | 12/2005 | Knieser et al. | |
| 6,977,569 B2 | 12/2005 | Deligianni et al. | |
| 7,091,647 B2 | 8/2006 | Jerman | |
| 7,251,466 B2 | 7/2007 | Porret et al. | |
| 7,304,556 B2 | 12/2007 | Tamura et al. | |
| 7,598,836 B2 | 10/2009 | Lee | |
| 7,732,975 B1 | 6/2010 | Hobbs et al. | |
| 7,933,112 B2 | 4/2011 | Ayazi et al. | |
| 7,977,136 B2 | 7/2011 | Ayazi et al. | |
| 8,039,922 B2 | 10/2011 | Ni | |
| 2002/0130586 A1 | 9/2002 | Mao et al. | |

(Continued)

FOREIGN PATENT DOCUMENTS

EP 1 785 391 A2 5/2007
WO WO-03055061 A1 7/2003

(Continued)

OTHER PUBLICATIONS

International Search Report mailed Oct. 7, 2011 in U.S. Appl. No. PCT/US2011/022483 in the name of Harris Corporation.

(Continued)

*Primary Examiner* — Robert Pascal
*Assistant Examiner* — Kimberly Glenn
(74) *Attorney, Agent, or Firm* — Fox Rothschild, LLP; Roberts J. Sacco

(57) ABSTRACT

Systems including varactor devices are provided. A varactor device (400) includes a gap closing actuator (GCA) varactor (200), includes a drive comb structure (201), an output varactor structure (514) defining an output capacitance, a reference varactor structure (214) defining a reference capacitance, and a movable truss comb structure (204) interdigitating the drive comb, the output varactor, and the reference varactor structures. The truss comb structure moves along a motion axis (205) between interdigitating positions based on a bias voltage. The device also includes a feedback circuit (404) configured for modifying an input bias voltage based on the reference capacitance to produce the output bias voltage that provides a target capacitance associated with the input bias voltage at the output varactor structure.

20 Claims, 8 Drawing Sheets

U.S. PATENT DOCUMENTS

| | | |
|---|---|---|
| 2003/0184413 A1 | 10/2003 | Nguyen |
| 2005/0073380 A1 | 4/2005 | Howell et al. |
| 2005/0088255 A1 | 4/2005 | Sengupta et al. |
| 2006/0003482 A1 | 1/2006 | Chinthakindi et al. |
| 2006/0261702 A1 | 11/2006 | Harada et al. |
| 2008/0157627 A1 | 7/2008 | Kato et al. |
| 2009/0002915 A1 | 1/2009 | Ayazi et al. |
| 2010/0091372 A1 | 4/2010 | Yamanoi et al. |
| 2011/0198202 A1 | 8/2011 | Rogers |

FOREIGN PATENT DOCUMENTS

| | | |
|---|---|---|
| WO | 2008123525 A1 | 10/2008 |

OTHER PUBLICATIONS

Information about Related Patents and Patent Applications, see section 6 of the accompanying Information Disclosure Statement Letter, which concerns Related Patents and Patent Applications.

Rogers, John E., et al., "Bi-Directional Gap Closing MEMS Actuator Using Timing and Control Techniques," IEEE Industrial Electronics, IECON 2006—32nd Annual Conference, Publication Date: Nov. 6-10, 2006; pp. 3149-3154.

U.S. Appl. No. 12/708,265, filed Feb. 18, 2010, entitled "MEMS-Based Ultra-Low Power Devices".

U.S. Appl. No. 12/610,735, filed Nov. 2, 2009, entitled "MEMS-Based Tunable Filter".

Tas N.R., et al.: "Technical Note; Design, Fabrication and Test of Laterally Driven Electrostatic Motors Employing Walking Motion and Mechanical Leverage" Journal of Micromechanics & Microengineering, Institute of Physics Publishing, Bristol, GB, vol. 13, No. 1, Jan. 1, 2003, pp. N6-N15, XP020068883.

Harris Corporation, International Search Report dated Mar. 16, 2011; Application Serial No. PCT/US2010/054889.

International Search Report mailed Mar. 5, 2012; Application Serial No. PCT/US2011/023321, in the name of Harris Corporation.

Yalcinkaya, A.D., "Low Voltage High-Q SOI MEMS Varactors fro RF Applications"; 2003 IEEE Proceedings of the 29th European Solid-State Circuits Conference, ESSCIRC '03, Sep. 16-18, 2003, pp. 607-610, with one IEEE Xplore abstract page.

Fedder, G.K., "Tunable RF and Analog Circuits Using on-Chip MEMS Passive Components"; 2005 IEEE International Solid-State Circuits Conference, ISSCC 2005, Feb. 9, 2005, Digest of Technical Papers, pp. 390-391.

100

200

200

200

200

624

US 8,373,522 B2

HIGH ACCURACY MEMS-BASED VARACTORS

FIELD OF THE INVENTION

The present invention relates to varactor circuits and methods for forming the same, and more specifically to micro-electro-mechanical system (MEMS) varactor circuits.

BACKGROUND

A varactor is an electrical device having a capacitance which is controlled by a suitable voltage bias. A varactor is used, for example, in Voltage Controlled Oscillators (VCOs), where a frequency of an oscillator is controlled by an applied voltage or current bias. VCOs are used, for example, when a variable frequency is required or when a signal needs to be synchronized to a reference signal. In radio communication devices, e.g. portable/cellular phones, VCOs are often used in Phase Locked Loop (PLL), circuits to generate suitable signals. Varactors are also useful in other circuits, such as tunable filter circuits, where the variable capacitance can be used to adjust the frequency characteristics of the filer circuit.

SUMMARY

Embodiments of the invention provide methods for fabricating high accuracy micro-electro-mechanical system (MEMS) varactor circuits and devices therefrom. In a first embodiment of the invention, a system including a varactor device is provided. In the system, the varactor device includes a gap closing actuator (GCA) varactor. The GCA varactor includes at least one drive comb structure, at least one output varactor structure defining an output capacitance, at least one reference varactor structure defining a reference capacitance, and at least one movable truss comb structure interdigitating the drive comb, the output varactor, and the reference varactor structures. In the GCA varactor, the truss comb structure is configured to move along a motion axis between a plurality of interdigitated positions based on an output bias voltage applied between the truss comb structure and the drive comb structure. The varactor device also includes a feedback circuit electrically coupled to the reference varactor structure. The feedback circuit is configured for modifying an input bias voltage based on the reference capacitance to produce the output bias voltage that provides a target capacitance associated with the input bias voltage at the output varactor structure.

In a second embodiment of the invention, a method of operating a gap closing actuator (GCA) varactor is provided. The GCA varactor includes at least one drive comb structure, at least one output varactor structure defining an output capacitance, at least one reference varactor structure defining a reference capacitance, and at least one movable truss comb structure interdigitating the drive comb, the output varactor, and the reference varactor structures. In the GCA varactor, the truss comb structure is configured to move along a motion axis between a plurality of interdigitated positions based on an output bias voltage applied between the truss comb structure and the drive comb structure. The method includes the steps of providing an input bias voltage for the drive comb structure and modifying the input voltage based on said reference capacitance to produce the output bias voltage that provides a target capacitance associated with the input bias voltage at the output varactor structure.

DETAILED DESCRIPTION

Figure 1:
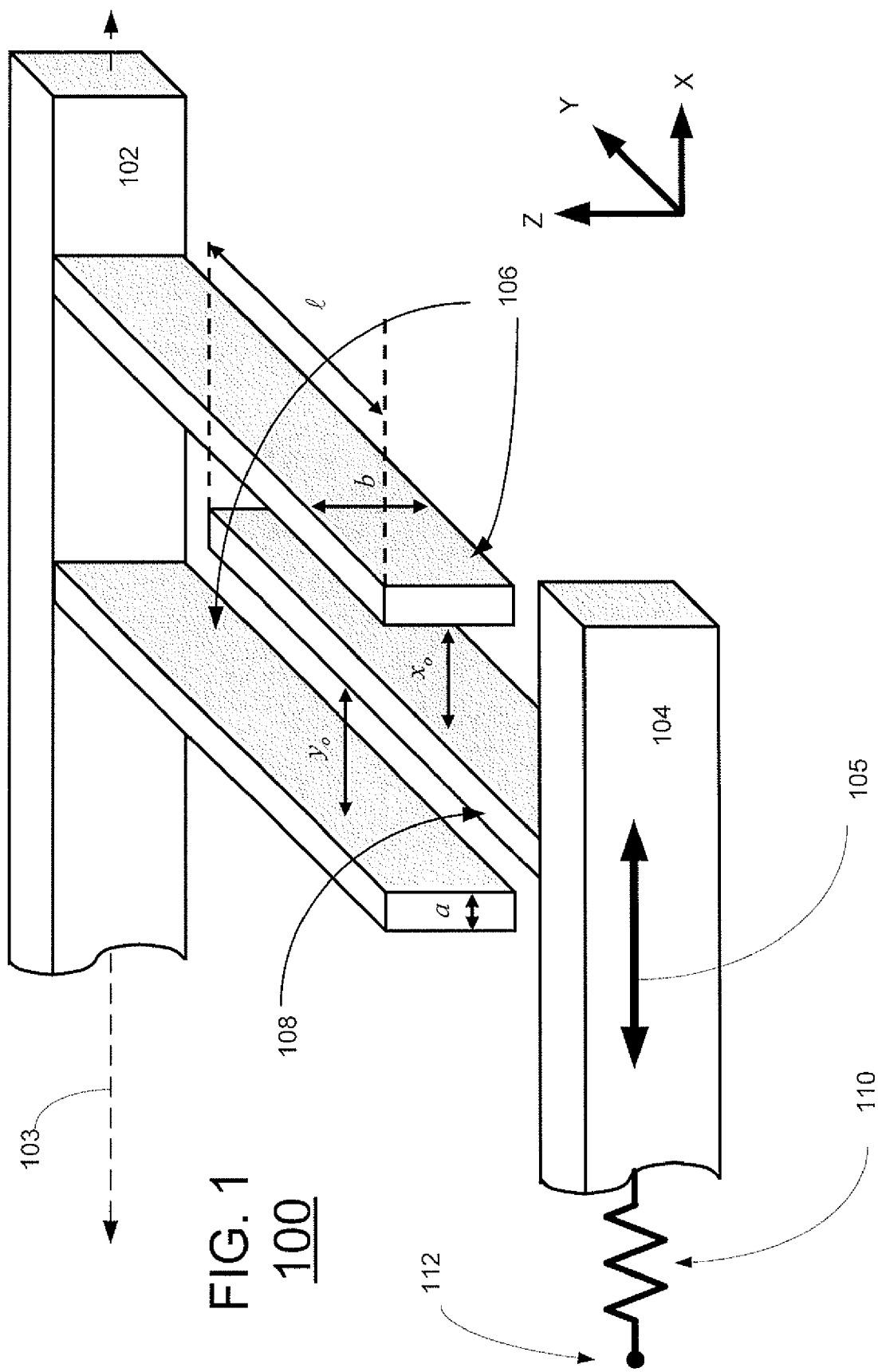
FIG. 1 shows a drive portion of a MEMS horizontal device which is useful for describing the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, varactors are used in a variety of applications, including tunable filter circuits for portable devices. In general, the key concerns for portable devices are size and power usage. Therefore, in order to reduce size and power requirements, it has been proposed that varactor devices be fabricated using integrated circuit (IC) and/or micro-electro-mechanical system (MEMS) technologies. However, such approaches generally result in relatively complex devices. For example, in the case of IC-based varactors, they can only be adjusted over a relatively narrow range of capacitance values. Therefore, to provide useful range of capacitances for some applications, such as a tunable filter circuit adjustable over a range of 100's of MHz, a large number of such capacitors and a circuit for selecting between these capacitors would typically be needed. As a result, IC-based filters have relatively large and complex designs. In the case of conventional MEMS-based varactors, MEMS capacitors can be used to provide varactors with an adjustable capacitance, limiting the number of capacitors required. However, such devices are typically complex to produce. For example, a basic MEMS-based filter bank will require at least three levels of devices: (1) MEMS levels to form the varactors, (2) thick metal levels to form any necessary inductors, and (3) IC device levels to provide interconnects and switches for directing signals. Further, conventional MEMS-based varactors generally have significantly different geometries than other types of devices, requiring more complex processes and designs to successfully form both types of devices on the same substrate. This typically results in manufacturing techniques with smaller process margins, increasing overall development and manufacturing costs.

In view of the limitations of such conventional varactor devices, one aspect of the invention is to provide MEMS-based varactors using MEMS horizontal gap closing actuator (GCA) devices. As used herein with respect to MEMS devices, the term "horizontal GCA device" refers to a MEMS device in which actuation and interaction of the components in the MEMS device is limited to directions parallel to the supporting substrate. That is, actuation of the horizontal GCA device results in a substantially lateral motion. Consequently, such MEMS devices can be fabricated with one or two masks rather than the multiple masks (>2) typically required for conventional IC or MEMS varactors. This reduces the overall complexity for designing and manufacturing MEMS varactor devices. The operation and manufacture of such horizontal GCA devices is described below with respect to FIGS. 1, 2, and 3A-3C.

FIG. 1 shows a drive portion 100 of a MEMS horizontal GCA varactor in accordance with an embodiment of the invention. Drive portion 100 includes a drive comb structure 102 having a fixed position and extending along a longitudinal axis 103. Drive portion 100 also includes a truss comb structure 104 that extends substantially parallel to axis 103 and that can elastically move along the X direction along a motion axis 105 substantially parallel to axis 103 of drive comb structure 102. For example, as shown in FIG. 1, truss comb structure 104 can include or be attached to at least one restorative or resilient component 110 connected to a fixed end 112. The resilient component 110 restores a position of truss comb structure 104 when no external forces are being applied. The drive comb structure 102 can have one or more drive fingers 106 extending therefrom towards truss comb structure 104. The truss comb structure 104 can similarly include one or more truss fingers 108 extending therefrom towards drive comb structure 102.

As shown in FIG. 1, the drive comb structure 102 and the truss comb structure 104 can be positioned to be interdigitating. The term "interdigitating", as used herein with respect to comb structures, refers to arranging comb structure such that the fingers extending from such comb structures at least partially overlap and are substantially parallel.

In the embodiment shown in FIG. 1, fingers 106 and 108 each have a width and a height of a and b, respectively, and overlap of l. Although comb structures with multiple sets of fingers can be configured to have the same dimensional relationships (width, height, and overlap) the invention is not limited in this regard and dimensional relationships can vary, even within a single GCA varactor. Furthermore, the portion shown in FIG. 1 and the dimensional relationship shown in FIG. 1 are only the electrically conductive portions of drive portion 100. As one of ordinary skill in the art will recognize, comb structures can further include structural portions comprising non-conductive or semi-conductive materials extending in the Z direction to provide structural support for the conductive portions shown in FIG. 1. Such structures are more fully described below with respect to FIG. 3.

The drive portion 100 shown in FIG. 1 operates on the principle of electrostatic attraction between adjacent interdigitating fingers. That is, motion of the truss comb structure 104 can be generated by developing a voltage difference between the drive comb structure 102 and the truss comb structure 104. In the case of device 100, the voltages applied at comb structures 102 and 104 are also seen at fingers 106 and 108, respectively. The resulting voltage difference generates an attractive force between fingers 106 and fingers 108. If the generated electrostatic force between fingers 106 and finger 108 is sufficiently large to overcome the other forces operating on truss comb structure 104 (such as a spring constant of resilient component 110), the electrostatic force will cause the motion of the truss comb structure 104 between a first interdigitated position (resting position at a zero voltage difference) and a second interdigitated position (position at a non-zero voltage difference) among motion axis 105. Once the voltage difference is reduced to zero, resilient component 110 restores the position of truss comb structure 104 to the first interdigitating position.

As shown in FIG. 1, each finger 108 in truss comb structure 104 can be disposed between two fingers 106 of drive comb structure 102. Accordingly, an electrostatic force is generated on both sides of finger 108 when a voltage difference is developed between comb structures 102 and 104. Therefore, to ensure movement of truss comb structure 104 in only one direction in response to a voltage difference, fingers 108 are positioned with respect to fingers 106 such that the electrostatic force in the a first direction along the X-axis is greater than the electrostatic force in an opposite direction in the X-axis. This is accomplished by configuring the finger spacing (i.e., spacing between fingers of interdigitated comb structures) in the first direction along the X-axis ($x_0$) and the finger spacing in the opposite direction along the X-axis ($y_0$) to be different when the voltage difference is zero. Since the amount of electrostatic force is inversely proportional to the distance between fingers, the motion of truss comb structure will be in the direction associated with the smaller of $x_0$ and $y_0$. In the exemplary embodiments of the invention described below, $x_0$ will be used to identify the smaller of $x_0$ and $y_0$ The drive portion illustrated in FIG. 1 provides a control mechanism for horizontal actuation in a GCA varactor that can be precisely controlled by adjusting the voltage difference between the drive and truss comb structures. This allows continuous adjustment over a range of interdigitating positions (by adjusting the voltage continuously over a voltage range).

Although the drive portion described above could be coupled to any variety of devices, using such a drive portion for various types of devices will only provide a partial improvement in manufacturing robustness and device reliability. In general, the robustness of the IC fabrication techniques used for fabricating MEMS devices and other types of devices is increased by reducing the variety of feature types and dimensional variation in each layer. The various embodiments of the invention exploit this characteristic. In particular, another aspect of the invention is to use the comb structure drive portion in conjunction with a comb structure based varactor portion, as shown below in FIG. 2.

Figure 2:
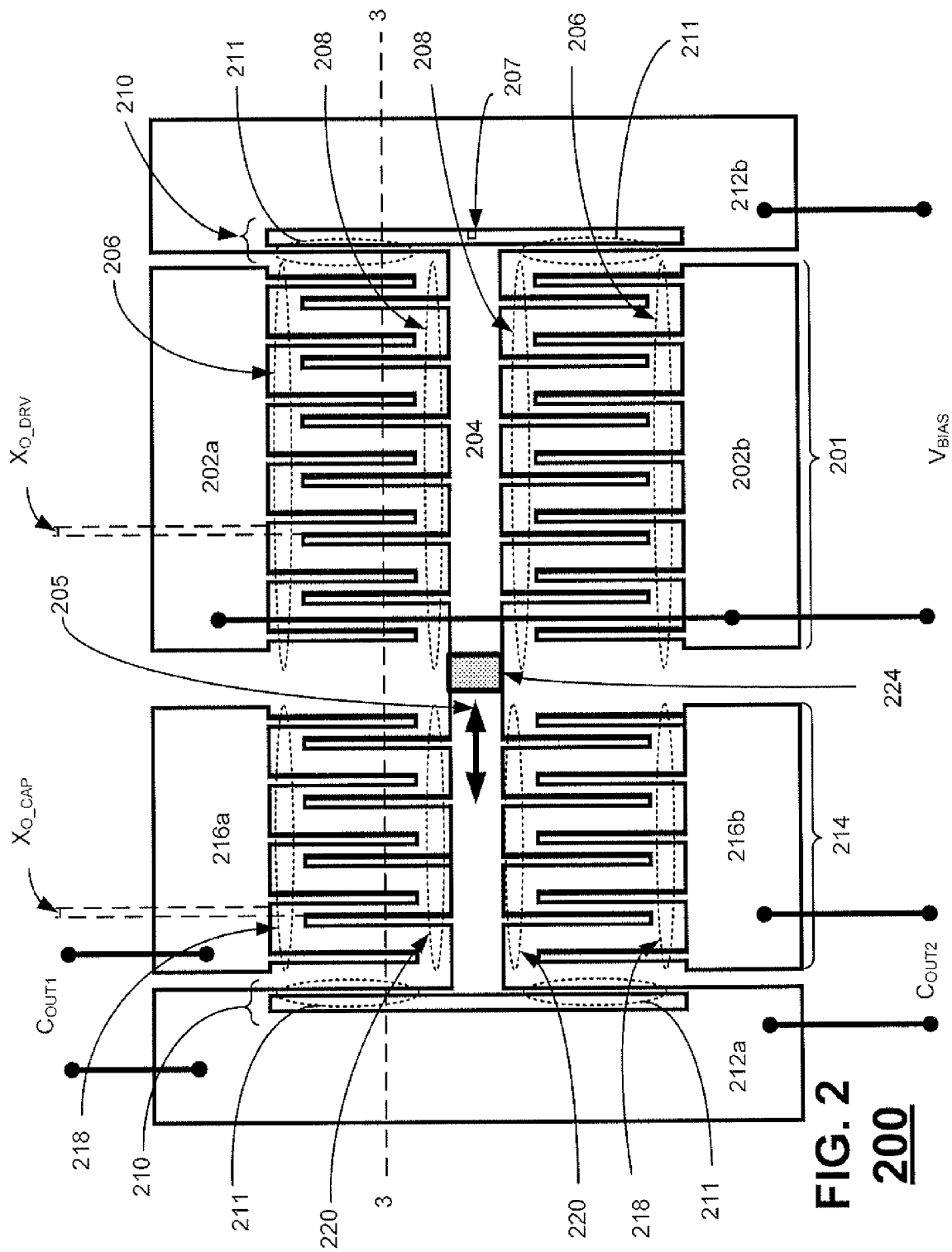
FIG. 2 shows an exemplary GCA varactor device which is useful for describing the invention.

FIG. 2 shows a top-down view of an exemplary MEMS varactor 200 in accordance with an embodiment of the invention. As shown in FIG. 2, varactor 200 includes a drive portion 201, similar to the drive portion 100 described above with respect to FIG. 1. That is, drive portion 201 includes a drive comb structures 202a and 202b (collectively 202), a truss comb structure 204, drive fingers 206, and truss fingers 208.

Truss comb structure 204 also includes resilient portions 210 with fixed ends 212a and 212b (collectively 212). In the exemplary embodiment shown in FIG. 2, resilient portions 210 comprise resilient or flexible reed structures 211 mechanically coupling truss comb structure 204 to fixed ends 212. Therefore, a leaf spring structure is effective formed on the two ends of truss comb structure. In operation, as a force is exerted on truss comb structure 204 (by generating a voltage difference between fingers 206 and 208) the reed structures 211 deform to allow truss comb structure to move along motion axis 205 from a first interdigitated position to at least a second interdigitated position. Once the force is no longer being exerted, the reed structures 211 apply a restorative force to restore the position of the truss comb structure 204 to a first interdigitated position. The operation and configuration of components 202-212 is substantially similar to that of components 102-112 in FIG. 1. Therefore the discussion in FIG. 1 is sufficient for describing the operation and configuration for components 202-210 in FIG. 2.

As described above, in addition to the drive portion 201, varactor 200 also includes a variable capacitor or varactor portion 214, as shown in FIG. 2. The varactor portion 214 includes input/output comb structures 216a and 216b (collectively 216) having a fixed position. The input/output comb structures 216 can also have one or more sense fingers 218 extending therefrom. Within the varactor portion 214 of varactor 200, the truss comb structure 204 can additionally include one or more additional truss fingers 220 extending therefrom and interdigitating sense fingers 218. Therefore, the truss comb structure 204 interdigitates (via fingers 208 and fingers 220) both the drive fingers 206 and the sense fingers 218. As a result, the truss comb structure 204 couples and is part of both the drive portion 201 and the varactor portion 214.

In the embodiment shown in FIG. 2, fingers 206, 208, 218, and 220 are shown to be similarly dimensioned and having a same amount of overlap. However, the invention is not limited in this regard and dimensional relationships can be different in the drive portion 201 and varactor portion 214. Furthermore, the dimensional relationship can also vary within the varactor portion 214. Additionally, as described above with respect to FIG. 1, the comb structures 202, 204, and 216 can further include conductive portions and structural portions, comprising non-conductive or semi-conductive materials, to provide structure support for the conductive portions. The relationship between these portions will be described below in greater detail with respect to FIG. 3.

As described above, the varactor 200 is configured to provide functionality as a variable capacitor or varactor. In particular, the truss comb structure 204 is configured to provide an adjustable capacitance based on adjustment of the gap between a first capacitor plate, provided by fingers 218, and a second capacitor plate, provided by fingers 220. Therefore, varactor 200 forms a first adjustable capacitor or varactor between comb structure 216a and truss comb structure 204, with a capacitance of $C_{OUT1}$, and a second adjustable capacitor or varactor between comb structure 216b and truss comb structure 204, with a capacitance of $C_{OUT2}$.

In the various embodiments of the invention, these first and second varactors can be used separately or in combination. In combination, these varactors can be connected to provide capacitances in series or parallel. For example, to provide a series capacitance, the capacitance can be measured between comb structures 216a and 216b. In contrast to provide a parallel capacitance, the capacitance can be measure between comb structures 216a, 216b and fixed end 212a (if electrically coupled to fingers 220).

In some embodiments of the invention, a discontinuity 224 is provided to isolate fingers 220 from fingers 208. As described above, the discontinuity 224 can be provided to reduce any interference between the varactor portion 214 and the drive portion 201. For example, to prevent the charge stored between fingers 218 and 220 from affecting a voltage difference between fingers 206 and 208 and vice versa. However, if fixed ends 212a and 212b are both coupled to ground, isolation between drive portion 201 and varactor portion 214 is maintained without requiring such discontinuity 224.

Varactor 200 operates as follows. A circuit (not shown) is coupled to comb structures 216a, 216b, and fixed end 212a (if necessary, as described above). To increase amount of capacitance at $C_{OUT1}$ and $C_{OUT2}$, a voltage difference ($V_{BIAS}$) is developed between fingers 206 and 208 to generate electrostatic attraction between these fingers. For example, $V_{BIAS}$ is applied across drive comb structures 202 and fixed end 212b (which is electrically coupled to fingers 208) to cause sufficient electrostatic attraction between fingers 206 and 208 to induce motion of truss comb structure 204, and consequently motion of fingers 220 towards fingers 218, reducing a spacing $x_{0\_CAP}$ between fingers 218 and 220. Consequently, the changing of the spacing between the capacitor plates results in a different capacitance value for both $C_{OUT1}$ and $C_{OUT2}$. Therefore, to increase capacitance, $V_{BIAS}$ is selected to create an electrostatic force that is at least greater than the restorative force of reed structures 211 to cause motion of truss comb structure 204 along motion axis 205. Afterwards, to decrease the capacitance, $V_{BIAS}$ is reduced such that the electrostatic force is less than the restoring force applied by reed structures 211. The restoring force then acts on truss comb structure 204 to increase the gap between fingers 220 from fingers 218, and thus lower the capacitance.

Figure 3A:
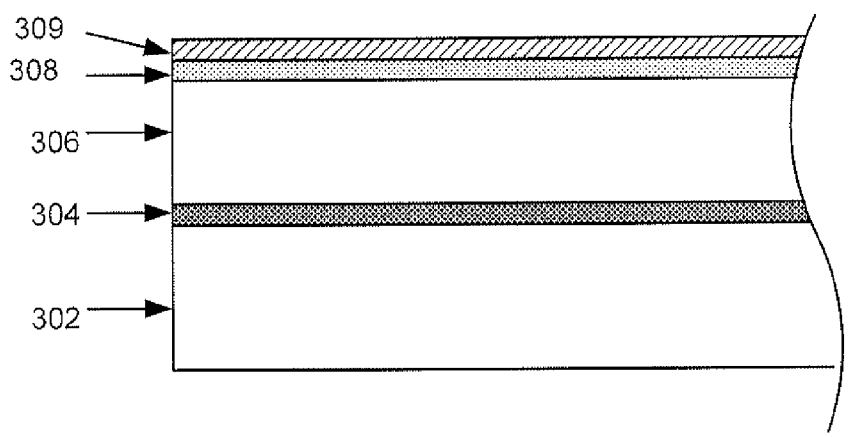
FIGS. 3A-3C show partial cross-sections of the device in FIG. 2 through cutline 3-3 during various steps of a fabrication process which is useful for describing the invention.
Figure 3B:
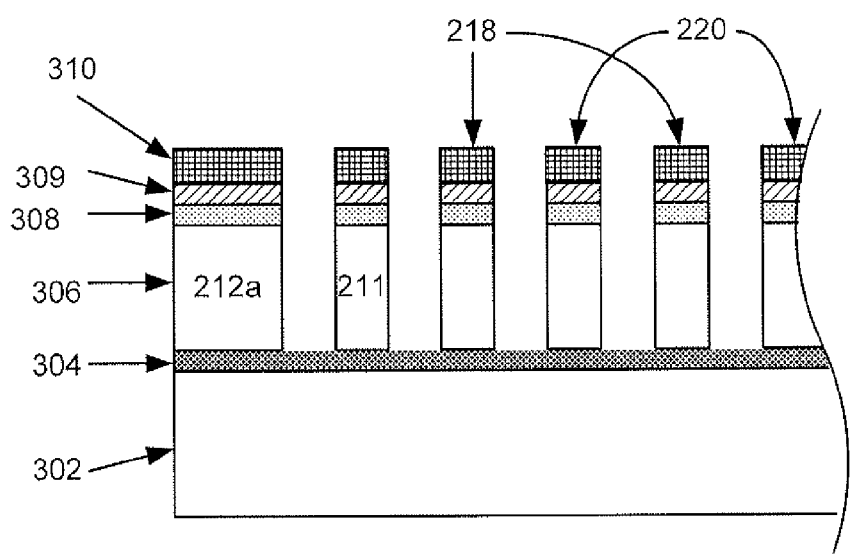
Figure 3C:
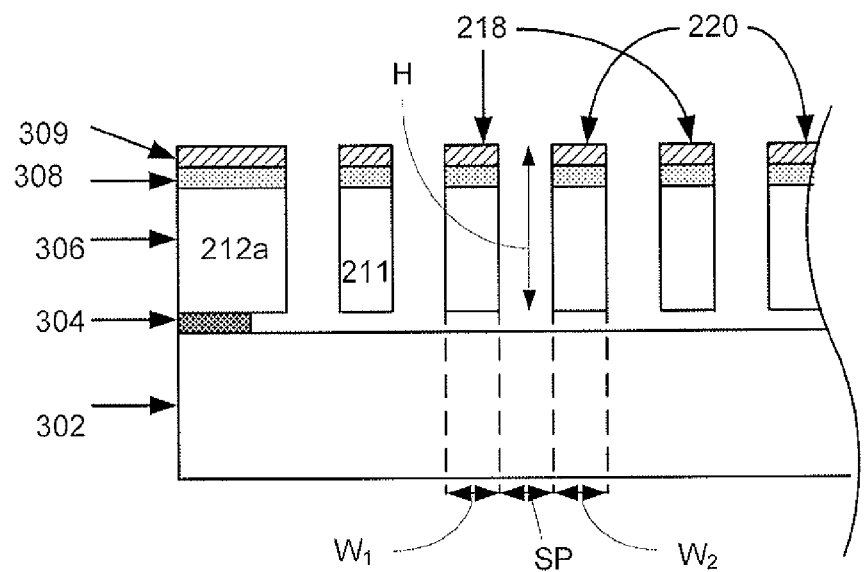

The structure shown in FIG. 2 can be fabricated using various IC and/or MEMS fabrication techniques. This is illustrated in FIGS. 3A-3C. FIGS. 3A-3C show partial cross-sections of device 200 through cutline 3-3 in FIG. 2 during various steps of a fabrication process in accordance with the various embodiments of the invention.

Manufacture of varactor 200 begins with the formation of the various layers used to form the structures in FIG. 2. As shown in FIG. 3A, this includes at least one base layer 302, at least one release layer 304 formed on base layer 302, at least one structural layer 306 formed on release layer 304, a lower conductive layer 308, and an upper conductive layer 309 formed on structural layer 306. The upper conductive layers 309 can one or more metal layers. The lower conductive layers 308 can comprise one or more adhesion layers to improve adhesion between upper conductive layers 309 and structural layer 306. However, in some embodiments, lower conductive layers 308 can be omitted. The materials for layers 304-309 can be formed on base layer 302 in a variety of ways, including thermal oxidation, physical/chemical deposition, sputtering, and/or electroplating processes, depending on the type and composition of the layer being formed.

In the various embodiments of the invention, the composition of structural layer 306 is selected such that it is electrically non-conductive. Furthermore, the composition of release layer 304 is selected such that it can be selectively removable, with respect to base layer 302, structural layer 306, and conductive layers 308, 309, using at least one removal process. For example, in some embodiments of the invention, layers 302-306 are provided by using a silicon on insulator (SOI) substrate. In such a substrate, the silicon oxide comprising layer sandwiched between two layers of silicon provides release layer 304 between the silicon-comprising base layer 302 and structural layer 306. One of ordinary skill in the art will recognize that various types of etch processes are readily available for removing silicon oxide comprising materials without substantially removing silicon comprising materials. However, the invention is not limited to SOI substrates. In other embodiments of the invention, the release layer 304 and structural layer 306 are formed on a silicon substrate that provides base layer 302. In still other embodiments, non-silicon comprising materials are used for forming layers 302-306.

Once layers 302-309 are formed, formation of the structures for device 200 can begin. In general, the structures shown in FIG. 3B for device 200 are formed by creating voids in conducting layers 308, 309, structural layer 306, and release layer 304. This step can be performed in a variety of ways. For example, as shown in FIG. 3B, a masking layer 310 can be formed on layer 309, having a mask pattern in accordance with the structures in device 200. For example, the portion of masking layer 310 shown in FIG. 3B shows the mask pattern for portions of reed structure 211, fixed end 212a, fingers 218, and fingers 220. Once the mask pattern is formed in masking layer 310, various dry and/or wet etching processes are used to transfer the mask pattern into conducting layers 308, 309 and structural layer 306.

Although the exemplary mask pattern shown in FIG. 3B provides for the same pattern to be transferred into both conducting layers 308, 309 and structural layer 306, the various embodiments of the invention are not limited in this regard. In some embodiments of the invention, two masking steps are performed. For example, a first mask pattern can be provided for etching conducting layers 308. Afterwards a second mask pattern is provided for etching structural layer 306.

Once the masking pattern has been transferred into structural layer 306, portions of release layer 304 are removed to "release" at least some portions of truss comb structure 204. This can be accomplished by providing an isotropic selective removal process to device 200. An isotropic process not only removes the exposed portions of release layer 304, but will also removes portions of release layer 304 (i.e., creates voids) beneath structural layer 306 in the vicinity of openings in structural layer 306 (i.e., undercut these structures). If the lateral dimensions of features in structural layer 304 are small enough (such as under reed structures 211, fingers 218, and fingers 220 shown in FIGS. 3A-C), all portions of the release layer 304 underneath such features will be removed. This process thus leaves such features free-standing or "released". These features will then only remain connected to other portions of device 200 via connections in other layers. For example, as shown in FIG. 3C, the portions of release layer 304 underneath portions of structural layer 306 associated with reed structures 211, fingers 218, and fingers 220 are removed. Still these features are attached to device 200 via other portions of structural layer 306 and/or conductive layers 308, as shown in FIG. 2. In one exemplary configuration, such structures can be realized by utilizing an SOI substrate and a hydrofluoric (HF) acid-based etch. First an etch process is used to form the voids shown in FIG. 3B. Afterwards, an HF acid-based etch process is used to selectively remove and undercut portions of the silicon oxide comprising layer, creating voids beneath selected features of device 200, to result in the structure shown in FIG. 3C.

The various embodiments of the invention are not limited to the exemplary manufacturing process described above. For example, in some embodiments of the invention, atomic layer epitaxial (ALE) processes are used to form conductive layers 308, 309 after etching of structural layer 306 and removal of release layer 304. In such embodiments, use of ALE process allows precise control of placement and thickness of conductive layer. As a result, device control can be improved since the dimensions of the active portions of the horizontal GCA device can be constructed with higher precision.

Although the process flow described above in FIGS. 3A-3C can be used to form the varactor illustrated in FIG. 2, one limitation of this process flow and similar process flows is that it can be difficult to fabricate such a device and match desired dimension accurately. In particular, several of the processing steps described above can give rise to errors in the dimensions of the drive comb structures 202, input/output comb structures 216, and the movable truss 204. For example, the various masking and etching steps can result in variations in the dimensions of fingers 206, 208, 218, and 220. In particular, the wet etching steps, such as the HF etch process described above, are generally difficult to control and can result in overetching of the resulting features. As a result, such steps can also result in variations of capacitor plate areas (i.e., the heights (H) and lengths (not shown) of fingers 206, 208, 218, 220), the widths (e.g., W1 and W2) of fingers 206, 208, 218, 220, the spacings (SP) between fingers 206 and 208 and between fingers 218 and 220. As a result, the values of $C_{OUT1}$ and $C_{OUT2}$ can vary significantly from device to device for a same $V_{BIAS}$.

Such variation is generally inherent in most types of varactor devices. That is, the manufacture of varactor devices of any type generally introduces some variation in the dimensions of the device. As a result, it is generally difficult to provide a varactor device that provides capacitance values accurately. One solution is to calibrate such devices. Thus, the appropriate values of $V_{BIAS}$ for target capacitance values can be determined prior to use. However, such a solution generally results in additional procedures being needed to install and use the varactor device. For example, the system utilizing the device would also need to be calibrated or adjusted to account for the variation in the varactor device being installed. Another solution is to monitor the capacitance value during use and provide adjustments during use. However, such a configuration results in at least some of the charge of the capacitor being diverted to sensing devices. As a result, the effective capacitance of the varactor is altered during such monitoring, again giving rise to capacitance errors. In yet another solution, a second, separate monitoring capacitor could be used to estimate the behavior of a first active capacitor of a circuit. However, such a configuration also generally results in errors. In particular, since the active and monitoring capacitors are manufactured separately, the monitoring capacitor may not accurately reflect the resulting structure of the active capacitor. Further, variations in wiring and contact resistances can result in different input signals being provided to the monitoring capacitor. Thus, the operation and resulting behavior of the monitoring capacitor may not accurately reflect the operation and behavior of the active capacitor.

In view of the limitations of the structure of FIG. 2 and other convention varactor devices, another aspect of the invention provides for fabricating high accuracy varactor devices by combining GCA varactor devices, as shown in FIG. 2, with a feedback circuit. In particular, the different comb structures of a single GCA varactor device are used to provide an output varactor portion and a reference varactor portion. In operation, the feedback circuit can be used to monitor the reference varactor portion and adjust the value of $V_{BIAS}$ provided to the GCA varactor device. Such a configuration is illustrated below in FIG. 4.

Figure 4:
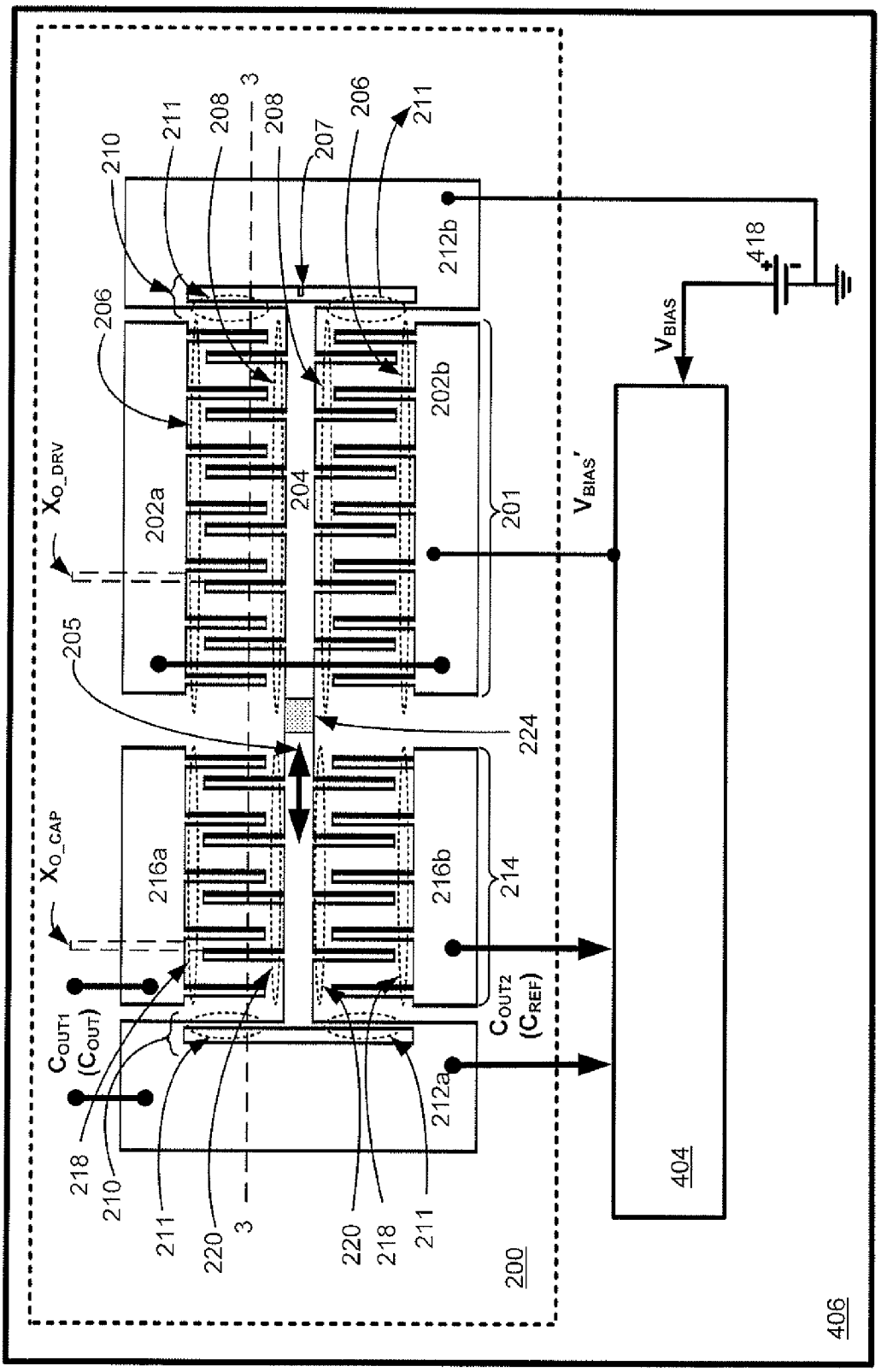
FIG. 4 shows a schematic of a first MEMS varactor device in accordance with an embodiment of the invention.

FIG. 4 shows a schematic of a MEMS varactor device 400 in accordance with an embodiment of the invention. As shown in FIG. 4, device 400 includes GCA varactor 200 coupled to a feedback circuit 404. In some embodiments of the invention, the GCA varactor 200 and the feedback circuit 404 can be formed on a same supporting structure 406, as shown in FIG. 4. For example, supporting structure 406 can be a substrate and the GCA varactor 200 and the feedback circuit 404 can be formed thereon using various IC and MEMS fabrication techniques. In another example, the GCA varactor 200 and the feedback circuit 404 can be formed on different supporting substrates and afterwards combined using conventional methods. Such methods can include system-in-a-package and/or printed circuit board (PCB) fabrication methods. However, the invention is not limited in this regard and the GCA varactor 200 and the feedback circuit 404 can be combined using other methods or formed and used on separate interconnected structures.

The GCA varactor 200 is configured similarly to the GCA varactor described above in FIG. 2. That is, the GCA varactor 200 includes a drive portion 201 similar to that of FIG. 2. Accordingly, the description provided above for FIG. 2 is sufficient for describing the structure and operation of components 202a, 202b, 204, 206, 207, 208, 210, 211, 212a, and 212b in FIG. 4. In addition to drive portion 201, the GCA varactor 200 also includes a varactor portion 214 similar to the varactor portion of FIG. 2. Accordingly, the description provided above for FIG. 2 is sufficient for describing the structure and operation of components 216a, 216b, 218, and 220 in FIG. 4.

As described above in FIG. 2, GCA varactor 200 provides first and second variable capacitors or varactors, $C_{OUT1}$ and $C_{OUT2}$. In the embodiment illustrated in FIG. 4, $C_{OUT2}$ can be used as a reference varactor for monitoring and accurately adjusting the $C_{OUT1}$. Such a configuration is more accurate for estimating the capacitance value of $C_{OUT1}$, as compared to conventional methods, for at least two reasons. First, the capacitance values of $C_{OUT1}$ and $C_{OUT2}$ vary due to the same action. That is, instead of adjusting the capacitance of a reference varactor using a portion of a bias signal or a different signal related the bias signal, a same signal independently and simultaneously adjusts both the output and reference varactors. For example, in FIG. 4, the bias voltage applied to the drive portion 201 causes the motion of the movable truss 204, which simultaneously changes the capacitance of both $C_{OUT1}$ and $C_{OUT2}$. As a result, any variations between the reference and output varactors that are normally caused by differences in wiring, contact resistance, and other signaling differences are effectively eliminated. Further, the electrical operation of $C_{OUT1}$ is not significantly affected by the electrical operation of $C_{OUT2}$. Second, since the comb structures 216a and 216b and the movable truss 204 are simultaneously fabricated in the same device, process bias-induced variations in the reference varactor are substantially reduced. In particular, global manufacturing variations are irrelevant since the reference varactor and the output varactor are part of the same device. Further, since these structures are formed side-by-side during the same process, localized manufacturing variations are also significantly reduced. Accordingly, the capacitance values provided by $C_{OUT2}$ will generally substantially track with the capacitance values provided by $C_{OUT1}$. As a result, $C_{OUT2}$ can be monitored and used to accurately determine any adjustment in bias voltage needed to provide a target output capacitance value at $C_{OUT1}$.

To this end, device 400 provides feedback circuit 404 for monitoring $C_{OUT2}$ and modifying $V_{BIAS}$ to provide a $V_{BIAS}'$ to provide the output capacitance target at $C_{OUT1}$ associated with a selected $V_{BIAS}$. In operation, a voltage source 418 applies a voltage $V_{BIAS}$ across the drive portion 201 (initially feedback circuit 404 does not modify $V_{BIAS}$ and thus $V_{BIAS} = V_{BIAS}'$) and fixed end 212b that is expected to cause motion of the movable truss 204 so that a particular output capacitance value is provided at $C_{OUT1}$. Although voltage source 418 is illustrated as a battery in the exemplary embodiments illustrated herein, the invention is not limited in this regard. In the various embodiments of the invention, voltage source 418 can be a variable voltage source receiving a control signal from one or more components on substrate 406, such as feedback circuit 404 or a separate controller circuit, or from one or more components located elsewhere.

The feedback circuit 404 then determines an amount of voltage adjustment for $V_{BIAS}$ based on the capacitance at $C_{OUT2}$. That is, feedback circuit determines the amount of voltage adjustment need for the capacitance at $C_{OUT2}$ to provide a target $C_{OUT2}$ capacitance associated with $V_{BIAS}$. Feedback circuit 404 then adjusts $V_{BIAS}$ by the voltage adjustment amount to obtain a voltage $V_{BIAS}'$. $V_{BIAS}'$ is then provided to the drive portion 201 to adjust the position of movable truss 204 beyond that provided by $V_{BIAS}$ alone. As a result, the capacitance values at $C_{OUT1}$ and $C_{OUT2}$ are adjusted. The process can then be repeated until $C_{OUT2}$ is at the capacitance value corresponding to the target capacitance value for $C_{OUT2}$ corresponding to a target capacitance value for $C_{OUT1}$ for the selected $V_{BIAS}$.

In the various embodiments of the invention, feedback circuit 404 can be configured using analog circuit elements, digital circuit elements, or a combination of both. Accordingly, one of ordinary skill in the art will recognize that the feedback circuit 404 can be implemented in a variety of ways. For example, in some embodiments of the invention, feedback circuit 404 can be a digital controller circuit that accepts $V_{BIAS}$, a capacitance value of $C_{OUT2}$ and that automatically computes or looks up a $V_{BIAS}'$ value for adjusting the capacitance value of $C_{OUT2}$ to a value associated with a target $C_{OUT1}$. In another example, a feedback circuit 404 can be fabricated using solely analog circuits. One such configuration will be described below in greater detail with respect to FIGS. 6-10.

In some instances, a larger capacitance may be needed than can be provided by the combination of comb structure 216a and movable truss 204 providing $C_{OUT1}$. One solution is to increase the number of fingers to increase the capacitance values for $C_{OUT1}$. Although such a solution can increase the capacitance for $C_{OUT1}$ without increasing the area occupied by GCA varactor 200, the maximum capacitance will limited by manufacturing tolerances. That is, in any MEMS manufacturing process, there will be a minimum line width and line spacing that is achievable. However, such minimum line widths and spacing may be undesirable since the resulting structures may be too thin or fragile to support themselves. Accordingly, it can be necessary to increase the area occupied by GCA varactor to accommodate an additional number of fingers. Although such a solution will also increase the capacitance values for $C_{OUT1}$, this solution also results in an increased area for the combination of comb structure 216b and movable truss 204 providing $C_{OUT2}$. As a result, a large amount of surface area of a substrate may be wasted on capacitor structures that are not required to provide a large capacitance value.

Figure 5:
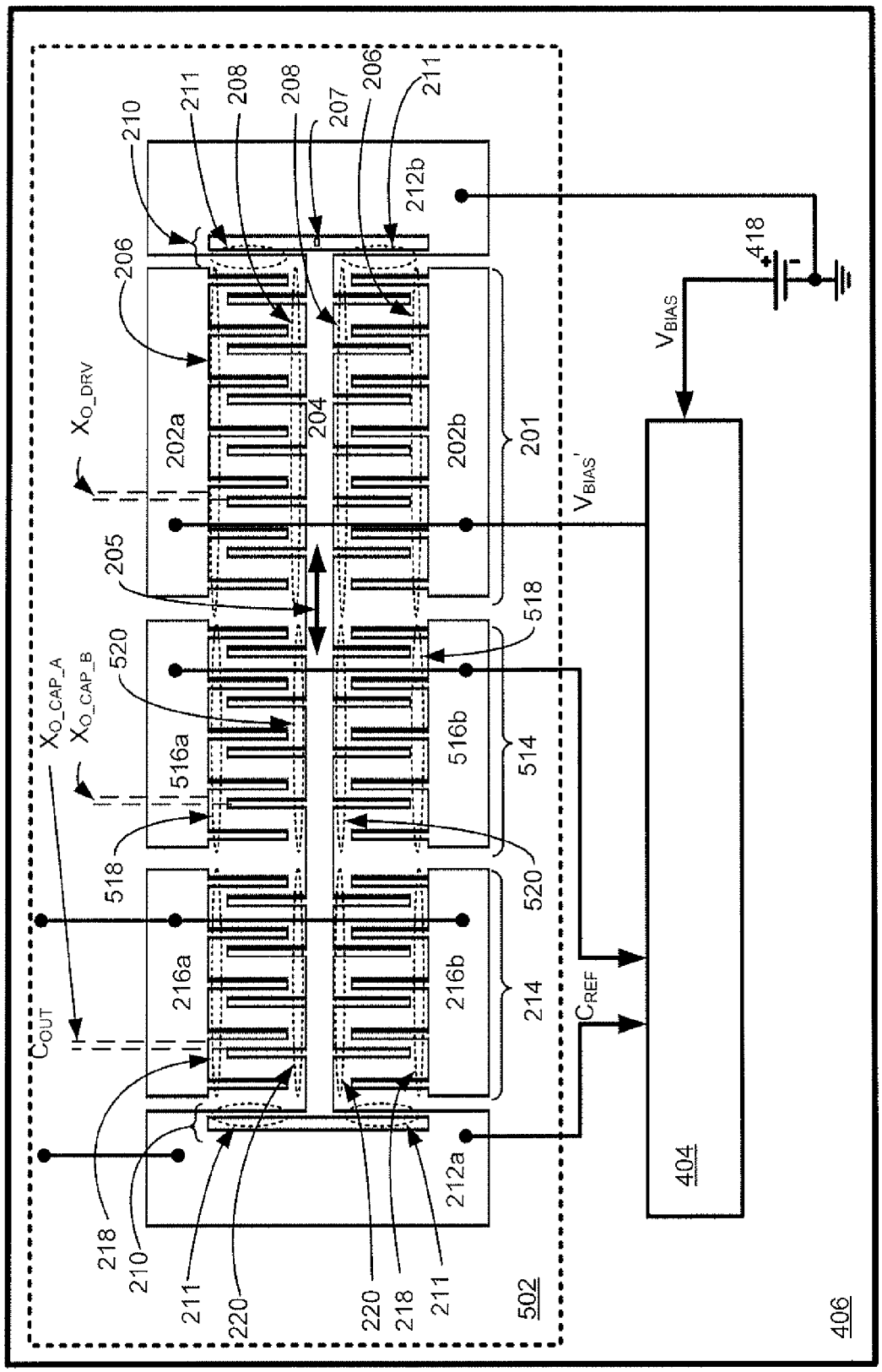
FIG. 5 shows a schematic of a second MEMS varactor device in accordance with an embodiment of the invention.

In view of the foregoing, some embodiments of the invention provide an alternative configuration for a MEMS varactor device. Such an alternate configuration is illustrated in FIG. 5. FIG. 5 shows a schematic of another MEMS varactor device 500 in accordance with an embodiment of the invention. Like the device in FIG. 4, device 500 also includes a GCA varactor 502 and a feedback circuit 404 which can be optionally formed on a same supporting structure 406.

As shown in FIG. 5, GCA varactor 502 is also configured similarly to the GCA varactor described above in FIG. 2. That is, the GCA varactor 502 also includes a drive portion 201, similar to the drive portion of FIG. 2. Accordingly, the description provided above for FIG. 2 is sufficient for describing the structure and operation of components 202a, 202b, 204, 206, 207, 208, 210, 211, 212a, and 212b in FIG. 5. The GCA varactor 200 also includes a first varactor portion 214 for providing an output capacitance $C_{OUT}$ using a parallel combination of $C_{OUT1}$ and $C_{OUT2}$, as shown in FIG. 5. This first varactor portion 214 is similar to the varactor portion of FIG. 2. Accordingly, the description provided above for FIG. 2 is sufficient for describing the structure and operation of components 216a, 216b, 218, and 220 in FIG. 5. Additionally, a relatively large output capacitance value is provided by coupling the varactor formed by comb structure 216a and movable truss 204 and the varactor formed by comb structure 216b and movable truss 204 in parallel.

However, in addition to drive portion 201 and first varactor portion 214, GCA varactor 502 also includes a second varactor portion 514 for providing the reference capacitance $C_{REF}$, as shown in FIG. 5. The second varactor portion 514 is also configured similarly to the varactor portion of FIG. 2. Accordingly, the description provided above for the varactor portion of FIG. 2 is also sufficient for describing the structure and operation of components 516a, 516b, 518, and 520 in FIG. 5.

In FIG. 5, first varactor portion 214 and second varactor portion 514 are shown as being similarly configured. That is, first varactor portion 214 and second varactor portion 514 are shown as including a similar number of fingers and in which the dimensions of the fingers are similar. However, the invention is not limited in this regard. In some embodiments of the invention, the dimensions of the fingers and the spacings can be different for varactor portion 214 as compared to varactor portion 514. Therefore, the first varactor portion 214 and the second varactor portion 514 can provide different capacitance values in other embodiments of the invention.

Such a configuration can be useful for providing a high accuracy GCA varactor occupying a relatively small area while providing a relatively large capacitance. For example, the first varactor portion 214 can be configured to have a large number of fingers 218, 220 to provide a relatively high capacitance. In contrast, the second varactor portion 514 can be configured to have a smaller number of fingers 518, 520, as compared to varactor portion 214, to provide a relatively lower capacitance. Furthermore, the reference capacitance value can be provided by coupling the varactor formed by comb structure 516a and movable truss 204 and the varactor formed by comb structure 516b and movable truss 204 in parallel, as shown in FIG. 5. This allows the area needed for second varactor portion 514 to be reduced further. As a result, a majority of the area of GCA varactor 502 associated with varactor structures can be occupied by the varactor structures for providing the output capacitance of GCA varactor 502.

GCA varactor 502 operates as follows. To increase the amount of capacitance provided by both the first varactor portion 214 and the second varactor portion 514, a voltage difference ($V_{BIAS}$) is developed between fingers 206 and 208 to generate electrostatic attraction between these fingers. For example, as shown in FIG. 5, $V_{BIAS}'$ is applied across drive comb structures 202 and fixed end 212b (which is electrically coupled to fingers 208) to cause sufficient electrostatic attraction between fingers 206 and 208 to induce motion of truss comb structure 204 along motion axis 205 and reduce $x_{0\_DRV}$. The motion of truss comb structure 204 consequently causes the simultaneous motion of fingers 220 towards fingers 218 and fingers 520 towards fingers 518. As a result, the spacing $x_{0\_CAP\_A}$ between fingers 218 and 220 is reduced and the spacing $x_{0\_CAP\_B}$ between fingers 518 and 520 is also reduced. Consequently, the reduction of these spacings also reduces the spacing between the capacitor plates in varactor portions 214 and 514, resulting in a change of the capacitance values provided by varactor portions 214 and 514.

As described above, the varactor portion 514 can be used as a reference varactor for monitoring and accurately adjusting the output capacitance of varactor portion 214 using feedback circuit 404, as described above with respect to FIG. 4. Accordingly, the description provided above for the device in FIG. 4 is also sufficient for describing the structure and operation of feedback circuit 404.

Figure 6:
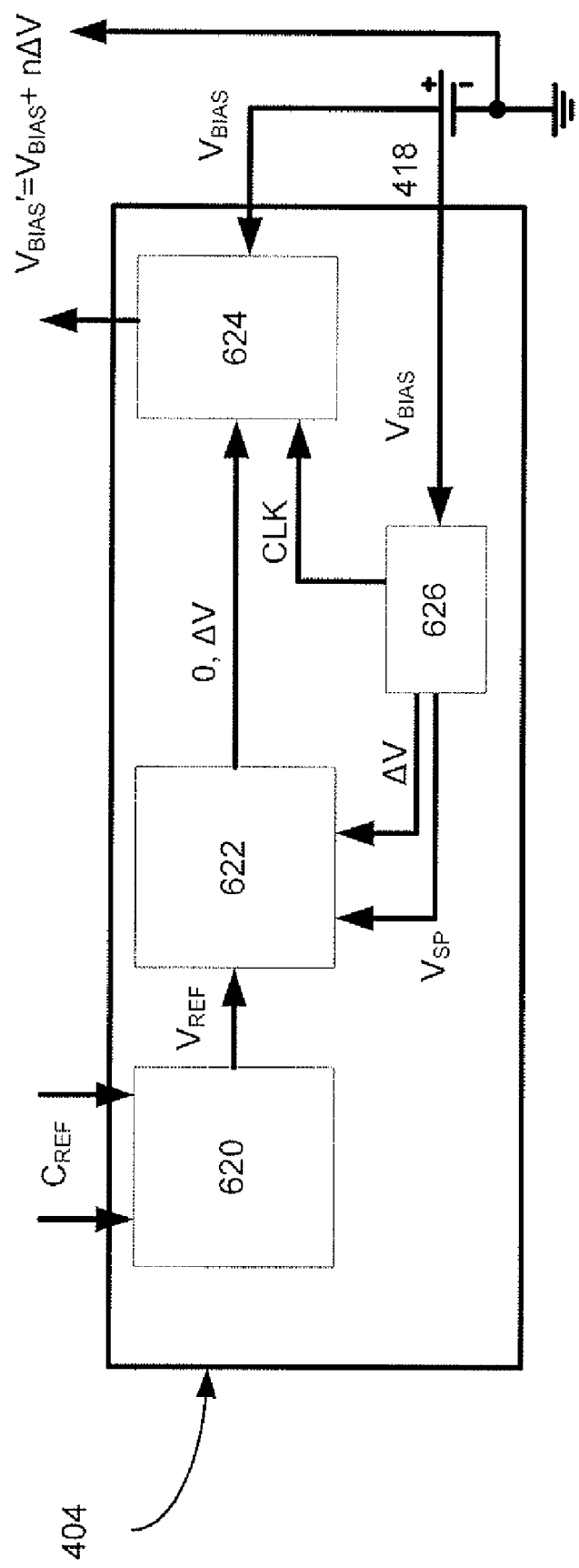
FIG. 6 shows a detailed schematic illustration of a configuration for a feedback circuit in a MEMS varactor device in accordance with an embodiment of the invention.

As described above, the feedback circuit 404 in FIGS. 4 and 5 is used to modify a bias voltage provided by bias source 418 ($V_{BIAS}$) in order to provide a VBIAS' that results in the target output capacitance value associated with $V_{BIAS}$. However, as also described above, the feedback circuit 404 in FIGS. 4 and 5 can be implemented in a variety of ways. For example, one exemplary implementation is described below with respect to FIG. 6. FIG. 6 shows a detailed schematic illustration of one exemplary configuration for the feedback circuit 404 in a MEMS varactor device in accordance with an embodiment of the invention. The configuration of the feedback circuit 404 includes a converter element 620 for performing a conversion step, a comparison element 622 for performing a comparison step, and a voltage adjusting element 624 for performing a voltage adjustment step. The feedback circuit 404 can also include a controller element 626. Although various blocks are shown in FIG. 6, one of ordinary skill in the art will readily recognize that any of the blocks shown in FIG. 6 can be combined.

The exemplary feedback circuit 404 in FIG. 6 operates as follows. First, $C_{REF}$ is converted to a voltage $V_{REF}$ using converter element 620, as described below with respect to FIGS. 7 and 8. Second, $V_{REF}$ is compared to a set point voltage $V_{SP}$ using a comparison element 622. In some embodiments, the controller element 626 can supply $V_{SP}$. In such a configuration, controller element 626 can receive $V_{BIAS}$ and automatically determine $V_{SP}$ using computational or lookup methods. However, the various embodiments of the invention are not limited in this regard and $V_{SP}$ can also be supplied by circuits external to feedback circuit 404. Based on this comparison, comparison element 622 generates an output signal comprising $\Delta V$ (indicating that no change is needed) or an incrementing voltage $\Delta V$ (indicating that a change is needed). An exemplary configuration for a comparison element will be described below in further detail with respect to FIG. 9. In operation, the comparison element 622 continues to generate an output signal comprising an incrementing voltage $\Delta V$ until $V_{REF}$ is less than or equal to $V_{SP}$. At such a value of $V_{REF}$, the reference varactor is assumed to be providing a capacitance value $C_{REF}$ corresponding to a target capacitance value $C_{OUT}$ for the output varactor. Accordingly, no further adjustment of $V_{BIAS}$ would be needed. However, as long as $V_{REF}$ is greater than $V_{SP}$, the voltage adjusting element 624 will continue accumulate a sum of $\Delta V$ over time and add this sum to $V_{BIAS}$ to produce an adjusted bias voltage $V_{BIAS}'$.

As described above, the feedback circuit 404 in FIG. 6 first performs a conversion step to convert the reference capacitance obtained from GCA varactor in FIG. 4 or 5 to a reference voltage $V_{REF}$. Such a step is used since comparison of capacitance values is generally non-trivial. However, conversion of a capacitance value to a voltage and comparison of voltages is relatively straightforward to implement. Accordingly, by converting the reference capacitance $C_{REF}$ to a reference voltage $V_{REF}$, the circuit configuration needed for making an adjustment to $V_{BIAS}$ is greatly simplified. An exemplary configuration for convertor circuit 620 shown in FIG. 7. However, the various embodiments of the invention are not limited in this regard and other circuits can be provided for converting the reference capacitance to a reference voltage.

Figure 7:
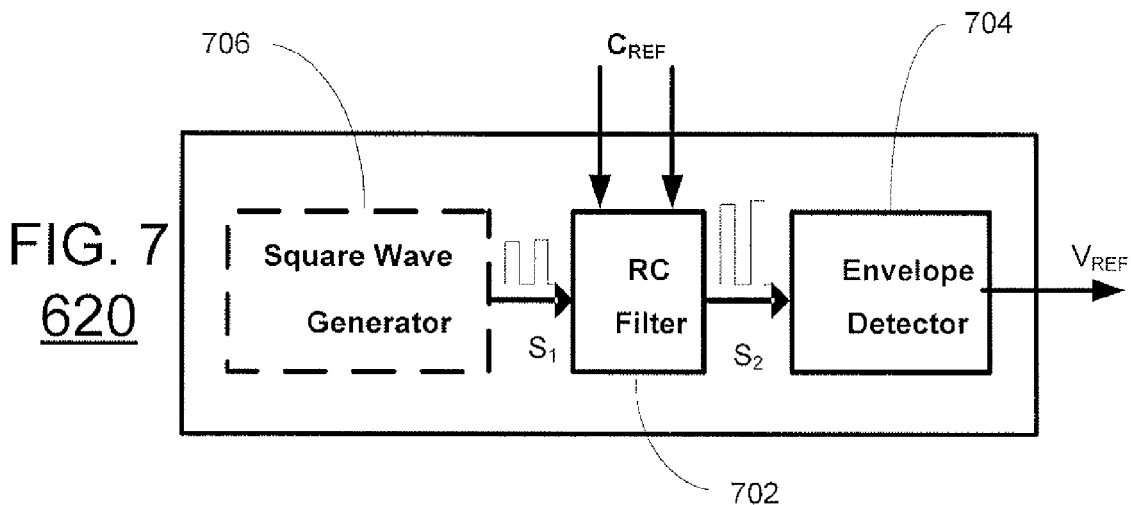
FIG. 7 shows an exemplary configuration for the converter element of feedback circuit in FIG. 6 in accordance with an embodiment of the invention.

FIG. 7 shows an exemplary configuration for the converter element 620 in accordance with an embodiment of the invention. In the exemplary configuration shown in FIG. 7, the converter element 620 can include a resistance-capacitance (RC) filter 702 and an envelope detector 704. In operation, the RC filter 702 receives a square wave input waveform $S_1$ and generates a time-varying output waveform $S_2$, where $S_2$ varies according to variations in $C_{REF}$. Envelope detector 704 then generates $V_{REF}$ based on waveform $S_2$. In some embodiments of the invention, waveform $S_1$ can be generated within converter element 620, using a square wave generator 706. However, the various embodiments of the invention are not limited in this regard and waveform $S_1$ can be provided from a square wave generator operating external to converter element 620. In the various embodiments of the invention, any type of square wave generator can be used to provide $S_1$. The design and fabrication of stand-alone and integrated square wave generators is well known to those of ordinary skill in the art and will not be described herein.

Figure 8:
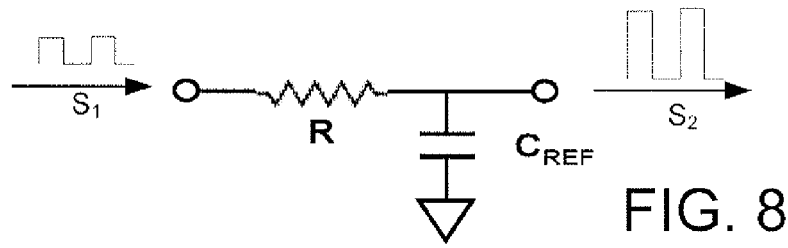
FIG. 8 shows a schematic illustration of the RC filter in FIG. 7 in accordance with an embodiment of the invention.

As shown in FIG. 7, an RC filter 702 is employed to generate waveform $S_2$ from waveform $S_1$. RC filter 702 can be configured in a variety of ways. One exemplary configuration is shown in FIG. 8. FIG. 8 shows a schematic illustration of an exemplary configuration for RC filter 702 in accordance with an embodiment of the invention. In FIG. 8, RC filter 702 is configured as a low pass filter. In particular, a resistor R and the reference capacitance $C_{REF}$ are arranged in series with a source of waveform $S_1$ and the voltage measured across $C_{REF}$ is used as waveform $S_2$. Therefore, as the value of $C_{REF}$ varies over time, the voltage or potential divider in RC filter 704 also changes over time. In particular, the variation in $C_{REF}$ results in a variable impedance that generally varies inversely proportional to $C_{REF}$, assuming that the frequency of $S_1$ is constant. Consequently, as $C_{REF}$ is increased over time, the variable impedance is also decreased. As a result, the voltage across $C_{REF}$ is also decreased over time and the waveform $S_2$ will also vary over time. In particular, the decreasing voltage across $C_{REF}$ will decrease the amplitude of $S_2$. Thus, the waveform $S_2$ provides a waveform with an amplitude inversely indicative of the current value of $C_{REF}$.

Referring back to FIG. 7, once waveform $S_2$ is generated, the waveform $S_2$ passes through envelope detector 704. In the various embodiments of the invention, any type of envelope detector circuit can be used. Such circuits are well known to those of ordinary skill in the art and will not be described herein. Envelope detector 704 is used to measure or detect the varying amplitude of the waveform $S_2$ due to the variations in $C_{REF}$. As a result, a value for $V_{REF}$ is generated, where $V_{REF}$ is a voltage signal that varies over time based on the variation in the amplitude of $S_2$ caused by the variation in $C_{REF}$. Accordingly, such a signal can then be used in a subsequent comparison step to determine if adjustment of $V_{BIAS}$ is needed.

In the comparison step, the reference voltage generated during the conversion step in converter element 620 can then be compared to a set point voltage $V_{SP}$ in a comparison element 622 to generate a signal that can be used during a subsequent voltage adjusting step to adjust the value of $V_{BIAS}$. Based on this signal, the adjustment step can be performed to adjust operation of the GCA varactor and thus the output capacitance. One exemplary configuration for comparison element 622 is shown in FIG. 9.

Figure 9:
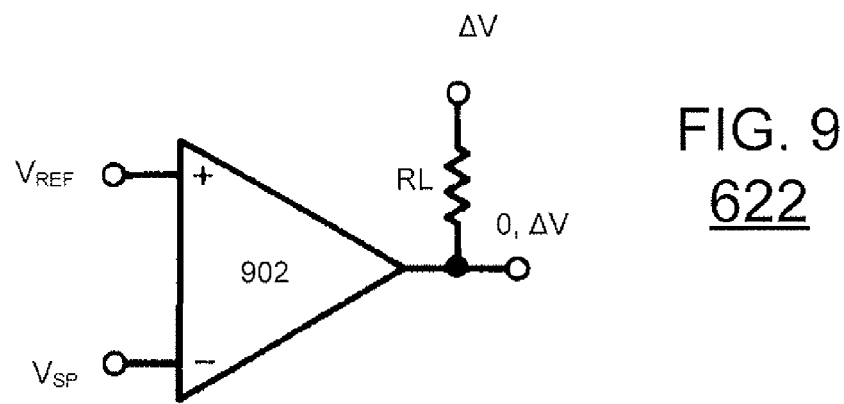
FIG. 9 shows a schematic illustration of an exemplary comparison element for the feedback circuit in FIG. 6 in accordance with an embodiment of the invention.

FIG. 9 shows a schematic illustration of an exemplary configuration for a comparison element 622 for the feedback circuit 404 in FIG. 6. The comparison element 622 can be provided using an operational amplifier (op-amp) comparator circuit, such as that as shown in FIG. 9. In FIG. 9, an op-amp circuit is illustrated including an op-amp comparator 902 with an output pull-up resistor RL. In such a configuration, the non-inverting input (+) of op-amp 902 can be configured to receive $V_{REF}$ and the inverting input (−) of op-amp 902 can be configured to receive $V_{SP}$. Furthermore, the pull-up resistor can be connected to an incrementing voltage $\Delta V$. As a result, if $V_{REF}$ is greater than $V_{SP}$, the comparator element 822 outputs $\Delta V$. In contrast, if $V_{REF}$ is less than $V_{SP}$, the comparator element 822 outputs 0V. However the various embodiments of the invention are not limited to the configuration illustrated in FIG. 9. Rather, any type of comparator element configuration for generating an output signal of 0V or $\Delta V$ based on a comparison of $V_{REF}$ and $V_{SP}$ can be used in the various embodiments of the invention.

Figure 10:
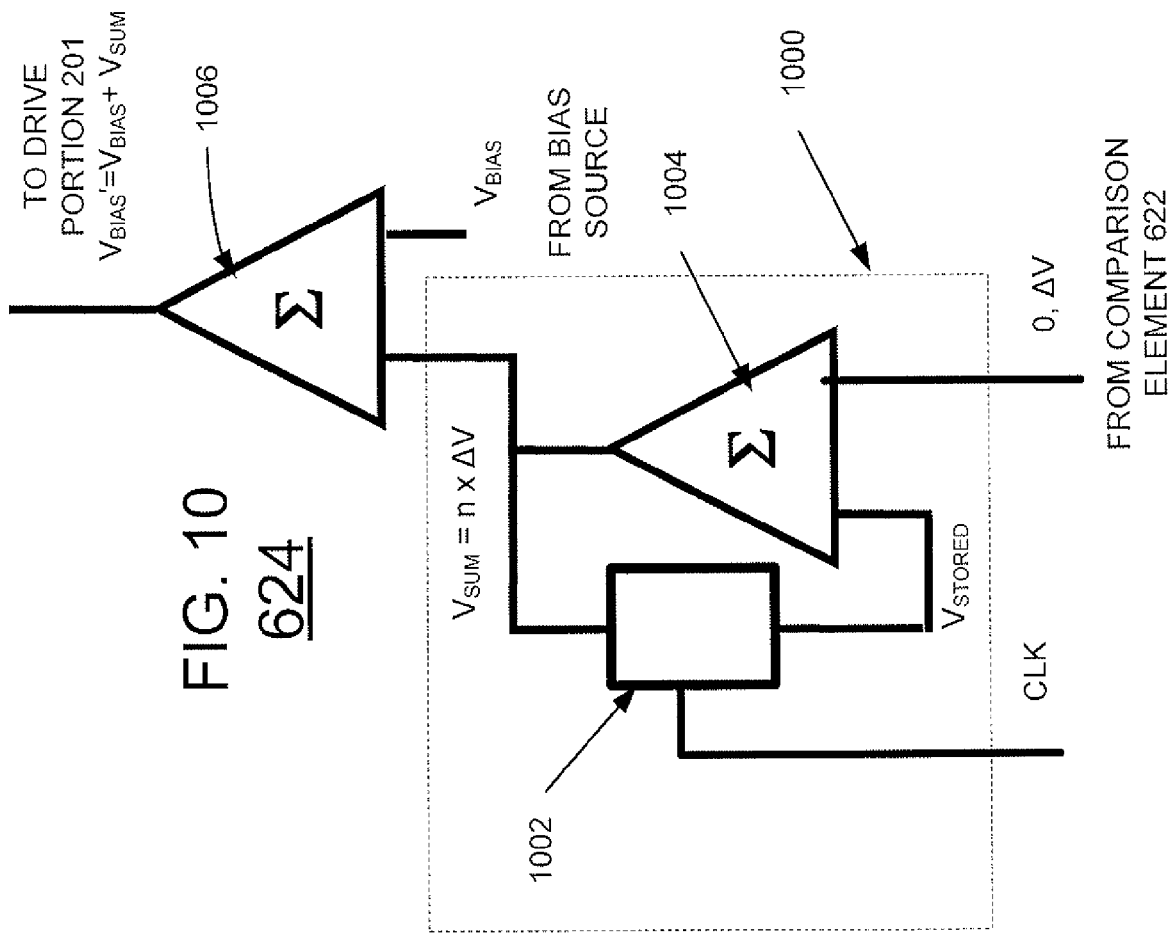
FIG. 10 shows an exemplary configuration for the voltage adjusting element for the feedback circuit in FIG. 6 in accordance with an embodiment of the invention.

Referring back to FIG. 6, once the conversion and comparison steps are is completed at elements 620 and 622, the resulting signal (either 0V or $\Delta V$) is provided to the voltage adjusting element 624. The voltage adjusting element 624 then performs the voltage adjusting step. FIG. 10 shows an exemplary configuration for the voltage adjusting element 624 of the feedback circuit 404 in FIG. 6. As shown in FIG. 10, the voltage adjusting element 624 includes an accumulator circuit 1000, including a gated voltage latch circuit 1002 and a first summing voltage circuit 1004. The term "gated voltage latch circuit", as used herein, refers to any type of circuit that can store a voltage level based on an enable signal. That is, a new voltage level cannot be stored in the circuit until an enable signal is received. In the various embodiments of the invention, any type of gated latch circuits can be used.

For example, in one embodiment of the invention the latch circuit 1002 can comprise a row of resistors increasing or decreasing in value and receiving $V_{SUM}$. These resistors would individually be connected to gated SR latches (clocked SR flip-flops). These SR flip-flops would then be connected back together to a summer circuit to provide a summed output for $V_{STORED}$. In operation, as the value of $V_{SUM}$ increases, the number of SR latches turn on also increases, based on the resistor values. However, as the SR latches are gated, the value for $V_{STORED}$ would only change based on the clock signal.

Feedback circuit 624 also includes a second summing voltage circuit 1006. The term "summing voltage circuit", as used herein, refers to any circuit capable of receiving at least two voltage signals and outputting a signal having a voltage equal to the sum of the received voltage signals. Such circuits are well known to those of ordinary skill in the art and will not be described herein.

Voltage adjusting circuit 624 operates as follows. Initially, the latch 1002 in accumulator circuit 1000 is configured to store a voltage $V_{STORED}$ equal to 0V. Thereafter, during a first clock cycle, latch 1002 outputs $V_{STORED}$ to summing circuit 1004 in accumulator circuit 1000. However, latch 1002 will not be enabled to store a new value for $V_{STORED}$. Summing circuit 1004 also receives an output of comparison element 622, comprising 0V or an incrementing voltage $\Delta V$. As a result, summing circuit 1004 generates a sum voltage $V_{SUM}$ comprising the sum of $V_{STORED}$ and one of 0V or an incrementing voltage $\Delta V$ provided by comparison element 622. As a result, $V_{SUM}$ will equal to 0V or $\Delta V$. During a following clock cycle, the clock signal CLK enables latch 1002 to store the $V_{SUM}$ as $V_{STORED}$. Accordingly, values of $\Delta V$ are accumulated over time. That is, $V_{STORED}$ is increased in increments of $\Delta V$. As result, the voltage $V_{SUM}$ will be equal to $n\Delta V$ over time, where n is an integer greater than 0. In some embodiments of the invention, signal CLK can be provided by controller 626, as shown in FIG. 6. However the various embodiments of the invention are not limited in this regard and signal CLK can be supplied by one or more external components.

At the same time as accumulator circuit 1000 is accumulating and summing values of ΔV, the result $V_{SUM}$ is passed to summing circuit 1006. Summing circuit 1006 also receives the bias voltage $V_{BIAS}$ from bias source 418. Summing circuit 1006 then generates a sum voltage $V_{BIAS}'$ equal to $V_{SUM} + V_{BIAS}$. The sum voltage $V_{BIAS}'$ is then provided to the drive portion of the GCA varactor. Over time, the voltage adjusting circuit 624 continues to increase $V_{BIAS}'$ as long $V_{SUM}$ is continued to be increased. Accordingly, once comparison element 622 ceases to output ΔV, no further changes to $V_{SUM}$ are provided, indicating that the output capacitance $C_{OUT}$ is at a target value.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system comprising a varactor device, said varactor device comprising:
   a gap closing actuator (GCA) varactor, comprising at least one drive comb structure, at least one output varactor structure defining an output capacitance, at least one reference varactor structure defining a reference capacitance, and at least one movable truss comb structure interdigitating said drive comb, said output varactor, and said reference varactor structures, said truss comb structure configured to move along a motion axis between a plurality of interdigitated positions based on an output bias voltage applied between said truss comb structure and said drive comb structure; and
   a feedback circuit electrically coupled to said reference varactor structure, said feedback circuit configured to selectively modify an input bias voltage based on said reference capacitance to produce said output bias voltage that provides a target capacitance at said output varactor structure.

2. The system of claim 1, wherein said feedback circuit comprises a converter element configured to generate a reference voltage based on said reference capacitance, a comparator element configured to compare said reference voltage to a set point voltage, and a voltage adjusting element configured to generate said output bias voltage based on said input bias voltage and a comparison output of said comparator element.

3. The system of claim 2, wherein said feedback circuit further comprises a controller element configured to generate said set point voltage.

4. The system of claim 2, wherein said converter element further comprises:
   a resistor-capacitor (RC) filter network defined by said reference varactor structure, said RC network configured to receive an input waveform and generate an output waveform; and
   an envelope detector network coupled to an output of said RC filter network, said envelope detector configured to generate said reference voltage from an envelope of said output waveform.

5. The system of claim 4, where said converter element further comprises a square wave generator electrically coupled to said RC filter network to provide said input waveform.

6. The system of claim 2, wherein said comparator element comprises a voltage comparator circuit configured to compare said set point voltage and said reference voltage and to generate said comparison output based on said comparison.

7. The system of claim 6, wherein said voltage comparator circuit outputs as said comparison output an incrementing voltage if said reference voltage is greater than said set point voltage, and said voltage comparator circuit outputs as said comparison output a ground voltage if said reference voltage is less than said set point voltage.

8. The system of claim 6, wherein said feedback circuit further comprises at least one controller element configured to define said incrementing voltage in said comparator element.

9. The system of claim 6, wherein said voltage adjusting element comprises an accumulator circuit coupled to a first summing circuit, said accumulator circuit configured to sum said comparison output over time to generate an adjustment voltage, and said first summing circuit generates said output bias voltage by adding said adjustment voltage to said input bias voltage.

10. The system of claim 9, wherein said accumulator circuit comprises a second summing circuit and a gated latch circuit.

11. The system of claim 10, wherein said feedback circuit further comprises a controller element configured to generate a clock signal for enabling said gate latch circuit to store an output of said second summing circuit.

12. The system of claim 1, further comprising a substrate, wherein said GCA structure and said feedback circuit are disposed on said substrate.

13. A method of operating a gap closing actuator (GCA) varactor comprising at least one drive comb structure, at least one output varactor structure defining an output capacitance, at least one reference varactor structure defining a reference capacitance, and at least one movable truss comb structure interdigitating said drive comb, said output varactor, and said reference varactor structures, said truss comb structure configured to move along a motion axis between a plurality of interdigitated positions based on an output bias voltage applied between said truss comb structure and said drive comb structure, the method comprising:

provinding an input bias voltage for said drive comb structure; and modifying said input voltage based on said reference capacitance to produce said output bias voltage that provides a target capacitance at said output varactor structure.

14. The method of claim 13, further comprising:

selecting an initial value for said output bias voltage using said input bias voltage associated with a target capacitance for said output capacitance;

obtaining a reference voltage based on a value of said reference capacitance resulting from said initial value of said output bias voltage;

comparing said reference voltage to a set point voltage associated with said target capacitance; and adjusting said output bias voltage based on said comparing to reduce a difference between said reference voltage and said set point voltage.

15. The method of claim 14, wherein said obtaining further comprises:

providing an input waveform;

converting said input waveform to an output waveform using a resistor-capacitor (RC) filter network defined by said reference varactor structure; and detecting an envelope of said output waveform;

outputting said envelope as said reference voltage.

16. The method of claim 15, where said providing said input waveform further comprises providing a square wave.

17. The method of claim 13, wherein said comparing further comprises:

comparing said set point voltage to said reference voltage;

outputting as said comparison output an incrementing voltage if said reference voltage is less than said set point voltage; and outputting as said comparison output a ground voltage if said reference voltage is greater than said set point voltage.

18. The method of claim 13, wherein said adjusting further comprises:

summing said comparison output over time to generate a next adjustment voltage, and outputting a sum of said next adjustment voltage and said input bias voltage as said output bias voltage.

19. The method of claim 18, wherein said summing said comparison output further comprises:

receiving said comparison output;

adding a previous adjustment voltage stored in a gated latch circuit to said comparison output to produce said next adjustment voltage; and storing said next adjustment voltage in said gated latch circuit.

20. The method of claim 19, wherein storing further comprises receiving a clock signal for enabling said gate latch circuit to store said next adjustment voltage.

* * * * *